(12) United States Patent
Nekozuka

(10) Patent No.: US 10,476,552 B2
(45) Date of Patent: Nov. 12, 2019

(54) ELECTRONIC DEVICE FOR PERFORMING ELECTRIC FIELD COMMUNICATION

(71) Applicant: KYOCERA Corporation, Kyoto (JP)

(72) Inventor: Hikaru Nekozuka, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/082,303

(22) PCT Filed: Feb. 24, 2017

(86) PCT No.: PCT/JP2017/007224
§ 371 (c)(1),
(2) Date: Sep. 5, 2018

(87) PCT Pub. No.: WO2017/154622
PCT Pub. Date: Sep. 14, 2017

(65) Prior Publication Data
US 2019/0089416 A1 Mar. 21, 2019

(30) Foreign Application Priority Data
Mar. 9, 2016 (JP) .................................. 2016-046206

(51) Int. Cl.
*H04B 5/00* (2006.01)
*H01Q 7/06* (2006.01)
(Continued)

(52) U.S. Cl.
CPC ....... *H04B 5/0037* (2013.01); *G06K 19/0723* (2013.01); *H01Q 7/06* (2013.01)

(58) Field of Classification Search
CPC ............ H01Q 7/00; H01Q 1/243; H01Q 1/38; H01Q 7/06; H01Q 21/28; H01Q 1/36; H01Q 13/10; H01Q 1/2208; H01Q 1/2216; H01Q 1/2225; H01Q 1/2283; H04B 5/0037; H04B 5/0081; H04B 5/0031; H04B 5/0075; H04B 5/0012; H04B 5/0087; H04B 5/00; H04B 5/0056; H04B 5/0062; H04B 5/02; H02J 7/025; H02J 50/12; H02J 5/005; H02J 50/05; H02J 50/10; H02J 50/80; H02J 50/70; H02J 17/00; H02J 50/40; H02J 50/90
See application file for complete search history.

(56) References Cited

U.S. PATENT DOCUMENTS 8,150,319 B2   4/2012   Yoshida et al.
8,810,195 B2   8/2014   Mochida et al.
(Continued)

FOREIGN PATENT DOCUMENTS

JP   2008-113519 A   5/2008
JP   2009-081771 A   4/2009
(Continued)

*Primary Examiner* — Golam Sorowar
(74) *Attorney, Agent, or Firm* — Studebaker & Brackett PC

(57) ABSTRACT

An electronic device according to the present disclosure is configured to perform electric field communication via an electric field transmission medium. The electronic device includes a first electrode and a second electrode for performing electric field communication, and a first magnetic sheet. The first electrode portion has at least a first loop antenna. The first magnetic sheet is disposed adjacent to the first electrode portion.

12 Claims, 9 Drawing Sheets

(51) Int. Cl.
*G06K 19/07* (2006.01)
*H04B 5/02* (2006.01)
*H04B 13/00* (2006.01)

(56) References Cited

U.S. PATENT DOCUMENTS

| | | | |
|---|---|---|---|
| 2009/0088114 A1 | 4/2009 | Yoshida et al. | |
| 2010/0309080 A1 | 12/2010 | Minemura et al. | |
| 2011/0025265 A1 | 2/2011 | Mochida et al. | |
| 2011/0115303 A1* | 5/2011 | Baarman | H02J 17/00 307/104 |
| 2012/0274521 A1 | 11/2012 | Minemura et al. | |
| 2012/0326520 A1* | 12/2012 | Konya | H04B 5/0031 307/104 |
| 2014/0210276 A1* | 7/2014 | Shinoda | H04B 5/0012 307/104 |
| 2015/0222009 A1* | 8/2015 | Asou | H01Q 1/243 343/702 |
| 2015/0256228 A1* | 9/2015 | Goma | H01Q 7/00 307/104 |
| 2015/0318933 A1 | 11/2015 | Washiro et al. | |

FOREIGN PATENT DOCUMENTS

| | | |
|---|---|---|
| JP | 2009-247124 A | 10/2009 |
| JP | 2009-290764 A | 12/2009 |
| JP | 2010-177766 A | 8/2010 |
| JP | 2010-283777 A | 12/2010 |
| JP | 2013030877 A | 2/2013 |
| JP | 2013-135358 A | 7/2013 |
| JP | 2013223222 A | 10/2013 |
| JP | 2014-183469 A | 9/2014 |
| WO | 2014/091806 A1 | 6/2014 |
| WO | 2016/088456 A1 | 6/2016 |

\* cited by examiner

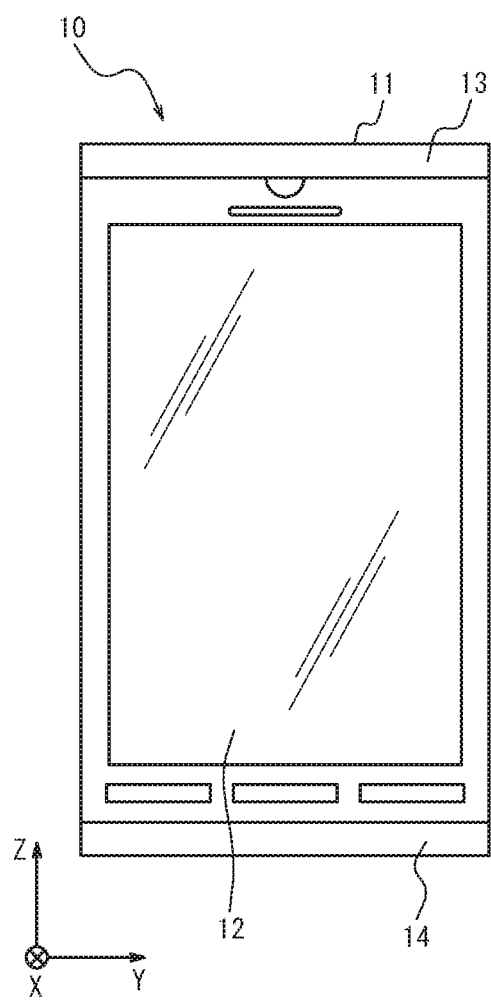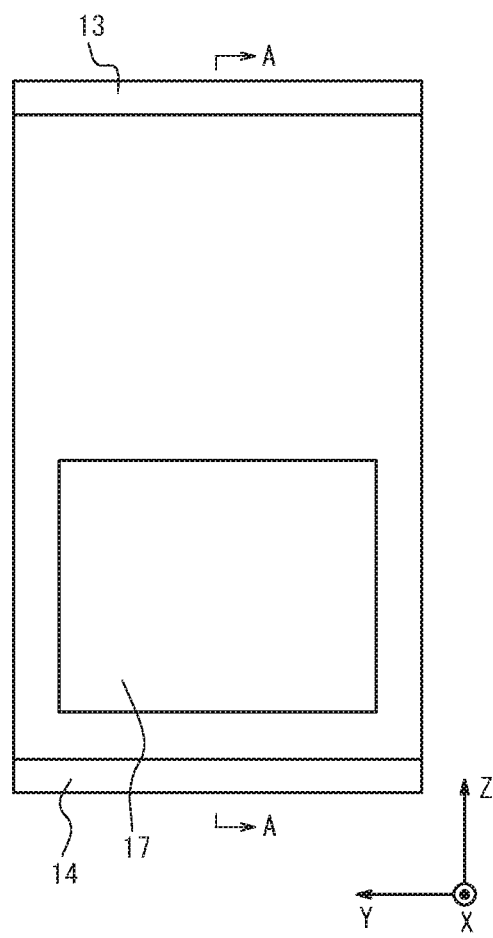

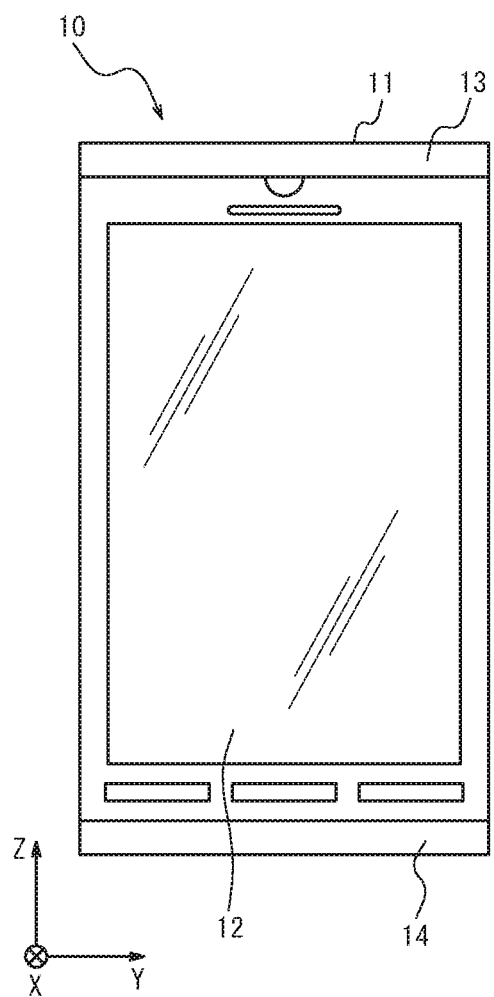
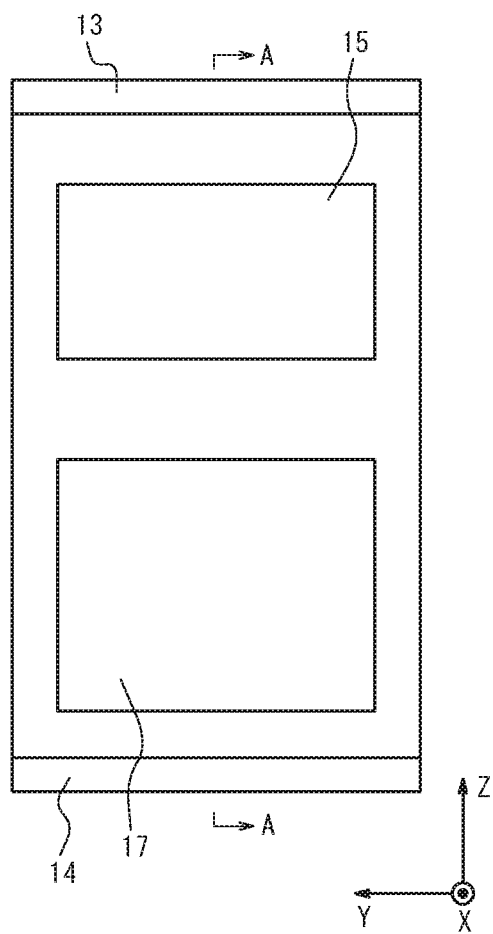
FIG. 11A
FIG. 11B

ELECTRONIC DEVICE FOR PERFORMING ELECTRIC FIELD COMMUNICATION

CROSS-REFERENCE TO RELATED APPLICATION

This application claims priority to and the benefit of Japanese Patent Application No. 2016-046206 filed Mar. 9, 2016, the entire contents of which are incorporated herein by reference.

TECHNICAL FIELD

The present disclosure relates to an electronic device that performs electric field communication via an electric field transmission medium.

BACKGROUND

In recent years, mobile terminals such as smartphones and the like are becoming more sophisticated, and as the functions increase, the number of antennas incorporated in a mobile terminal is also increasing. Since the corresponding frequency bands are different in each country, mobile terminals are required to deal with more countries by providing more functions. Therefore, mobile terminals have antennas at the outer periphery.

An electric field communication technology, in which an electric field is induced in an electric field transmission medium such as a human body or other conductor and data communication is performed using the electric field, has been proposed. Such electric field communication technology is also called human body communication. In order to newly install the electric field communication function into mobile terminals, a technology, in which an antenna used for communication utilizing RFID (Radio Frequency Identification) technology is used also as a part of an electrode used for electric field communication, has been proposed.

SUMMARY

An electronic device according to one embodiment of the present disclosure is configured to perform electric field communication via an electric field transmission medium. The electronic device includes a first electrode portion and a second electrode portion for performing electric field communication, and a first magnetic sheet. The first electrode portion has at least a first loop antenna. The first magnetic sheet is disposed adjacent to the first electrode portion.

BRIEF DESCRIPTION OF THE DRAWINGS

In the accompanying drawings:

FIGS. 6A and 6B schematically illustrate an electronic device according to Embodiment 5;

FIGS. 11A and 11B schematically illustrate an electronic device according to Embodiment 9;

DETAILED DESCRIPTION

When functions for electric field communication and communication using RFID technology are combined in an electronic device such as a smartphone or the like, stable communication operation is sometimes difficult due to the influence of conductors constituting an electrode on one side used for electric field communication. An electronic device according to the present disclosure enables stable operation by reducing the influence of the conductors constituting the electrode used for electric field communication.

Hereinafter, a plurality of embodiments will be described in detail with reference to the accompanying drawings.

Embodiment 1

Figure 1A:
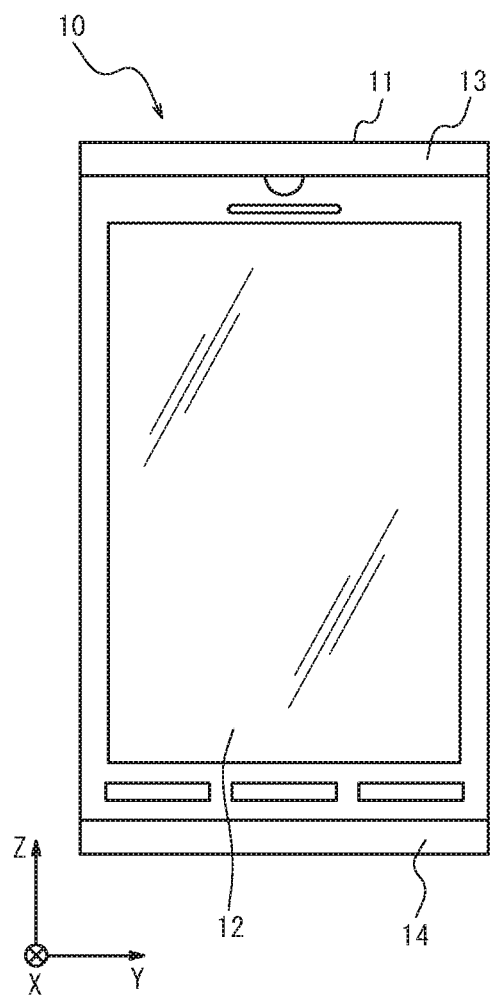
FIGS. 1A and 1B schematically illustrate an electronic device according to Embodiment 1.
Figure 1B:
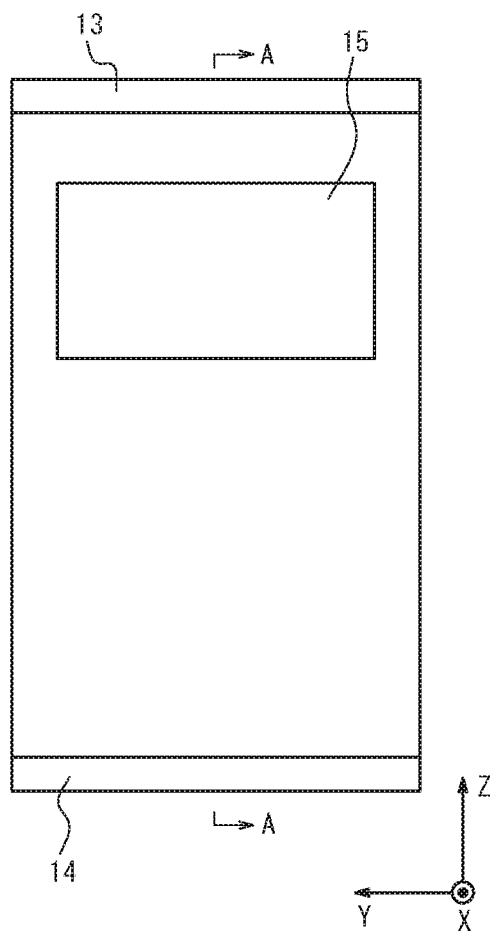

FIGS. 1A and 1B schematically illustrate an electronic device according to Embodiment 1. FIG. 1A is a front view of the electronic device, and FIG. 1B is a rear view of the electronic device.

The electronic device illustrated in FIGS. 1A and 1B is a mobile information terminal 10, such as a smartphone or the like, and has a display panel 12 with a rectangular shape made of, for example, liquid crystal, provided at the front surface of a housing 11 with a rectangular shape. The mobile information terminal 10 has a sub antenna 13 constituted by a GPS antenna, a wireless antenna or the like and a main antenna 14 for base station communication respectively on the top and the bottom of the housing 11. The mobile information terminal 10 further has a loop antenna 15 used for non-contact communication utilizing RFID technology such as Felica® (Felica is a registered trademark in Japan, other countries, or both), Mifare® (Mifare is a registered trademark in Japan, other countries, or both), or other NFC (Near Field Communication) at the rear surface of the housing 11. Non-contact communication refers to communication utilizing RFID technology. In the example illustrated in FIG. 1B, the loop antenna 15 is illustrated for ease of explanation, however, the loop antenna 15 is actually embedded in the housing 11 so as not to be visible to the user. An electromagnetic induction method is used as RFID technology in the present embodiment, however, a radio wave method may be used. Further, a passive type without a battery is used as RFID technology in the present embodiment, however, an active type with a battery may be used.

When the mobile information terminal 10 performs non-contact communication using the loop antenna 15, the user holds the mobile information terminal 10 over a fixed terminal device installed at, for example, a shop front. At this time, the magnetic field generated from the fixed terminal device interlinks with the loop antenna 15, and electromotive force is generated in the loop antenna 15 by electromagnetic induction. As described above, in non-contact communication, the mobile information terminal 10 transmits and receives personal information such as settlement information in accordance with the principle of electromagnetic induction.

Figure 2:
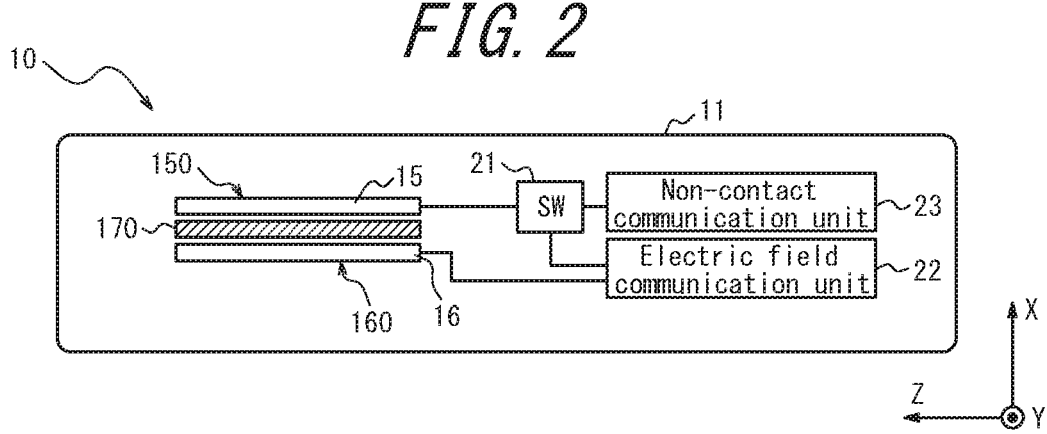
FIG. 2 schematically illustrates a cross section taken from line A-A in FIG. 1B.

FIG. 2 schematically illustrates a cross section taken from line A-A in FIG. 1B. In FIG. 2, the upper part of the housing 11 (namely, an X axis positive direction) is the rear surface of the mobile information terminal 10, and the lower part of the housing 11 (namely, an X axis negative direction) is the front surface of the mobile information terminal 10. The front surface is a surface on which a display surface for displaying images from a display panel 12 is formed.

The mobile information terminal 10 has the loop antenna 15 inside the housing 11. The loop antenna 15 is used for, for example, non-contact communication, however, it is also used for electric field communication as a first electrode portion 150. The mobile information terminal 10 further has, for example, an electrode 16 with a flat plate shape. The electrode 16 constitutes a second electrode portion 160. The first electrode portion 150 and the second electrode portion 160 constitute a condenser used for electric field communication. The condenser is disposed close to the rear surface of the housing 11 so as to be able to capacitively couple with the electric field around an electric field transmission medium such as a human body.

The electrode 16 has been described as having a flat plate shape, however, the present disclosure is not limited to this, and any shape may be used as long as the electrode 16, as the second electrode portion 160, is able to constitute a condenser with the first electrode portion 150. As illustrated in FIG. 2, the second electrode portion 160 is disposed directly under the first electrode portion 150 (the X axis negative direction), however, the present disclosure is not limited to this, and the second electrode portion 160 may be disposed at any position as long as it is able to constitute a condenser with the first electrode portion 150.

The mobile information terminal 10 further has a first magnetic sheet 170. The first magnetic sheet 170 is disposed adjacent to the first electrode portion 150. In FIG. 2, the first electrode portion 150, the second electrode portion 160, and the first magnetic sheet 170 are disposed in an order of the first electrode portion 150, the first magnetic sheet 170, and the second electrode portion 160 in a direction from the rear surface of the housing 11 towards the inside of the housing 11 (namely, the X axis negative direction in FIG. 2). As the first magnetic sheet 170, a metal-based sheet or a ferrite-based sheet can be used.

The mobile information terminal 10 further has a switch 21 connected to the loop antenna 15, an electric field communication unit 22 connected to the switch 21, and a non-contact communication unit (communication unit) 23 connected to the switch 21. The electric field communication unit 22 is also connected to the second electrode portion 160.

The switch 21 is to be switched according to whether the mobile information terminal 10 performs electric field communication or non-contact communication. When the mobile information terminal 10 performs electric field communication, the switch 21 connects the first electrode portion 150 and the electric field communication unit 22. Thus, electric field communication can be performed by the first electrode portion 150, the second electrode portion 160, and the electric field communication unit 22.

When the mobile information terminal 10 performs non-contact communication, the switch 21 connects the loop antenna 15 and the non-contact communication unit 23. Thus, non-contact communication can be performed by the loop antenna 15 and the non-contact communication unit 23.

According to the present embodiment, the following two effects can be obtained by disposing the first magnetic sheet 170 between the first electrode portion 150 and the second electrode portion 160.

Firstly, the electromagnetic influence from the conductors constituting the second electrode portion 160 on the loop antenna 15 is reduced by the first magnetic sheet 170. Secondly, by disposing the first magnetic sheet 170 adjacent to the first electrode portion 150, a magnetic field is pulled in and interlinks with the loop antenna 15 more easily. That is, the convergence effect of magnetic fluxes is enhanced by the first magnetic sheet 170. The loop antenna 15 is used for communication such as non-contact communication or the like, and as the first electrode portion 150, is also used for electric field communication. Therefore, the mobile information terminal 10 according to the present embodiment also enables space saving.

Accordingly, by disposing the first magnetic sheet 170 in the above described manner, it is possible to perform non-contact communication operations with greater stability and high accuracy using the loop antenna 15.

Embodiment 2

Figure 3:
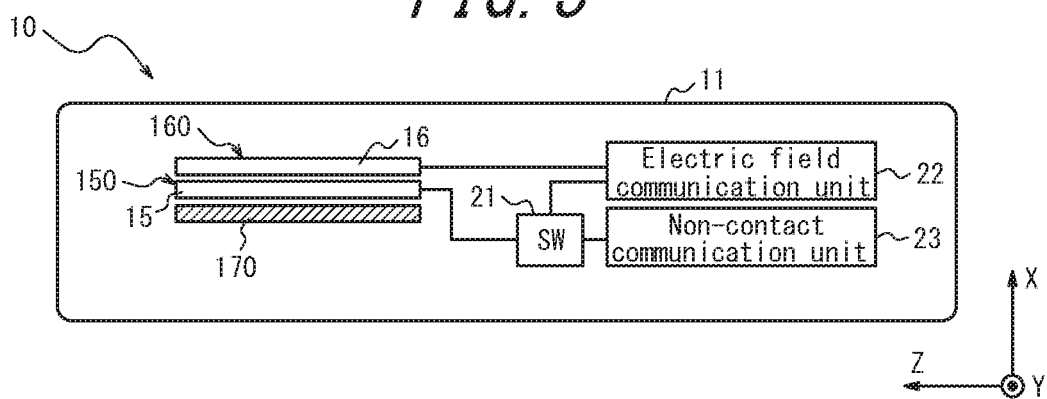
FIG. 3 schematically illustrates a main part of an electronic device according to Embodiment 2.

FIG. 3 schematically illustrates a main part of an electronic device according to Embodiment 2. The electronic device according to the present embodiment has different arrangement of the first electrode portion 150, the second electrode portion 160, and the first magnetic sheet 170 from the mobile information terminal 10 of Embodiment 1. Hereinafter, the components similar to those of Embodiment 1 will be given the same reference signs and description thereof will be omitted, and differences from Embodiment 1 will be mainly described.

The first electrode portion 150, the second electrode portion 160, and the first magnetic sheet 170 are disposed in an order of the second electrode portion 160, the first electrode portion 150, and the first magnetic sheet 170 in a direction from the rear surface of the housing 11 towards the inside of the housing 11 (namely, the X axis negative direction in FIG. 3).

The electrode 16 constituting the second electrode portion 160 has a mesh structure, for example. The reason for adopting mesh structure is as follows. That is, when the user holds the mobile information terminal 10 over a fixed terminal device to perform non-contact communication, the electrode 16 is sandwiched by the fixed terminal device and the loop antenna 15. Assuming that the electrode 16 has a flat plate shape, since the magnetic field from the fixed terminal device is shielded by the electrode 16 which is a conductor, the mobile information terminal 10 cannot perform non-contact communication using the loop antenna 15. However, when the electrode 16 has a mesh structure, since the magnetic field passing through the openings of the mesh structure interlinks with the loop antenna 15, the mobile information terminal 10 is able to perform non-contact communication. Here, as the mesh structure, the intervals between the conductors constituting the electrode 16 may be an interval sufficiently smaller than the wavelength of the electromagnetic radiation used in non-contact communication.

The electrode 16 has been described as having a mesh structure, however, the present disclosure is not limited to this, and as described above, any structure may be used as long as a part of the electromagnetic radiation from the fixed terminal device can pass through or penetrate the electrode 16.

Similarly to the case of Embodiment 1, according to the mobile information terminal 10 of Embodiment 2, the convergence effect of magnetic fluxes is enhanced by the first magnetic sheet 170. Additionally, the first magnetic sheet 170 also reduces the electromagnetic influence from the conductors constituting a substrate and the like disposed further inside the housing 11 than the first magnetic sheet 170 itself. Accordingly, with the first magnetic sheet 170, it is possible to perform non-contact communication operations with greater stability and high accuracy using the loop antenna 15.

Embodiment 3

Figure 4:
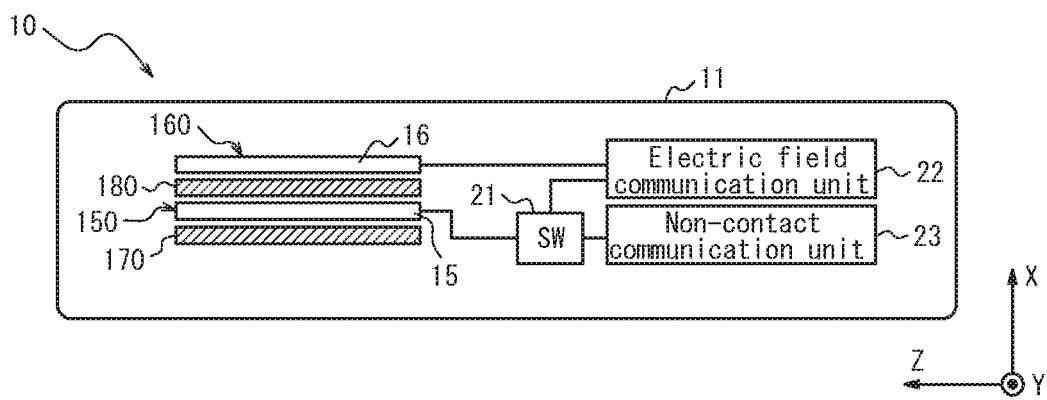
FIG. 4 schematically illustrates a main part of an electronic device according to Embodiment 3.

FIG. 4 schematically illustrates a main part of an electronic device according to Embodiment 3. The electronic device according to the present embodiment is obtained by adding a second magnetic sheet 180 to the mobile information terminal 10 of Embodiment 2. Hereinafter, the components similar to those of Embodiment 2 will be given the same reference signs and description thereof will be omitted, and differences from Embodiment 2 will be mainly described.

The second magnetic sheet 180 is disposed between the second electrode portion 160 and the first electrode portion 150. That is, the loop antenna 15 is disposed to be sandwiched by the first magnetic sheet 170 and the second magnetic sheet 180. Similarly to Embodiment 2, the electrode 16 constituting the second electrode portion 160 has a mesh structure, for example. However, the electrode 16 is not limited to having a mesh structure, and any structure may be used as long as a part of the magnetic field from the fixed terminal device can pass through or penetrate the electrode 16.

According to the present embodiment, the following two effects can be obtained.

Firstly, the electromagnetic influence from the surrounding conductors on the loop antenna 15 is reduced. The surrounding conductors refer to the conductors constituting a substrate and the like disposed further inside the housing 11 than the first magnetic sheet 170 and the conductors constituting the second electrode portion 160. As described in Embodiment 2, the electromagnetic influence from the former is reduced by the first magnetic sheet 170. On the other hand, the electromagnetic influence from the latter is reduced by the second magnetic sheet 180.

Secondly, the effect of pulling a magnetic field into the loop antenna 15 is further enhanced, and thus a magnetic field having a higher magnetic flux density interlinks with the loop antenna 15. That is, the convergence effect of magnetic fluxes is further enhanced by the first magnetic sheet 170 and the second magnetic sheet 180.

Accordingly, by further adding the second magnetic sheet 180, it is possible to perform non-contact communication operations with greater stability and high accuracy without deteriorating the characteristics of non-contact communication using the loop antenna 15.

Embodiment 4

Figure 5A:
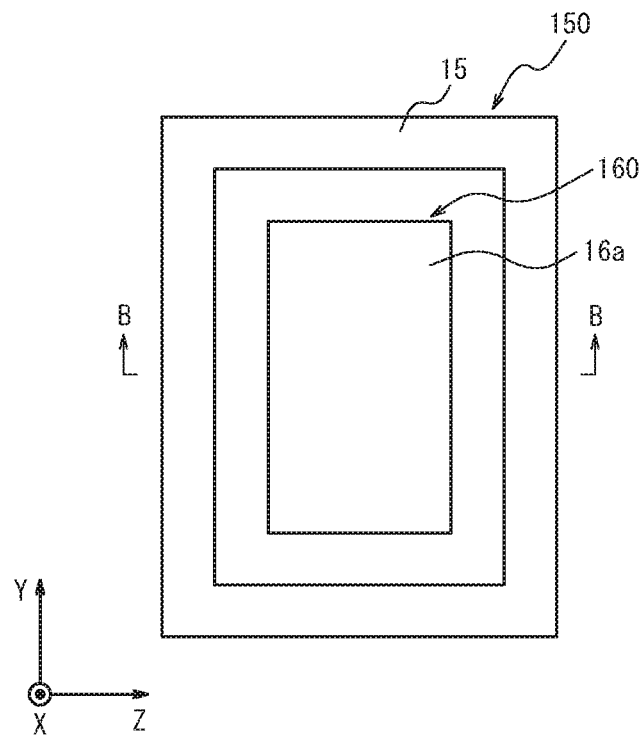
FIGS. 5A and 5B schematically illustrate a main part of an electronic device according to Embodiment 4.
Figure 5B:
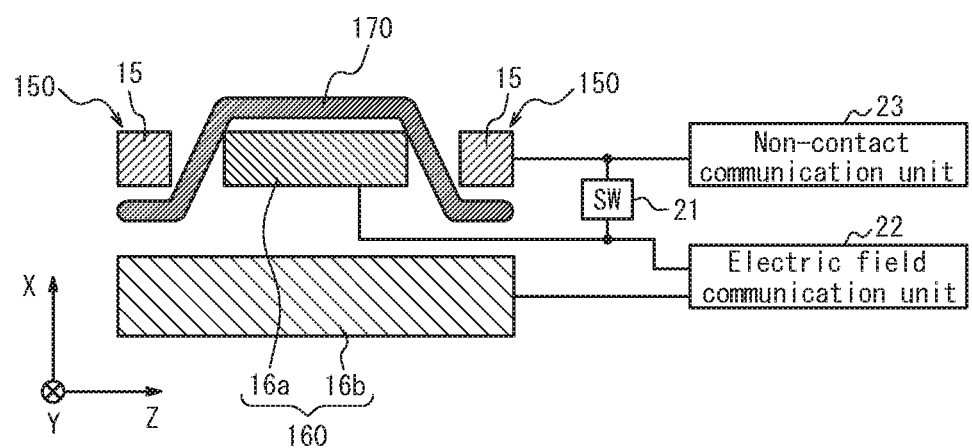

FIGS. 5A and 5B schematically illustrate a main part of an electronic device according to Embodiment 4. FIG. 5A is a rear view of the electronic device, and FIG. 5B is a cross-sectional view taken from line B-B in FIG. 5A. The electronic device according to the present embodiment is such that, in the mobile information terminals 10 described in Embodiments 1 to 3, an electrode 16a constituting the second electrode portion 160 is disposed inside the loop of the loop antenna 15 within substantially the same plane in which the loop antenna 15 constituting the first electrode portion 150 is disposed. Additionally, an electrode 16b constituting the second electrode portion 160 is disposed further inside the housing 11 than the electrode 16a. In the example illustrated in FIG. 5A, the loop antenna 15, the first electrode portion 150, and the second electrode portion 160 are illustrated for the ease of explanation. However, the loop antenna 15, the first electrode portion 150, and the second electrode portion 160 are actually embedded in the housing 11 so as not to be visible to the user.

In FIG. 5A, the first magnetic sheet 170 is not illustrated. The first magnetic sheet 170, as illustrated in FIG. 5B, is disposed adjacent to the first electrode portion 150 so as to fill the spaces between the loop antenna 15 and the electrode 16a. More particularly, the first magnetic sheet 170 is disposed at the lower side of the loop antenna 15, and by passing through a gap between the loop antenna 15 and the electrode 16a is disposed at the upper side of the electrode 16a. Then, the first magnetic sheet 170 passes through another gap between the loop antenna 15 and the electrode 16a and is again disposed at the lower side of the loop antenna 15. Here, the lower side of the loop antenna 15 refers to the surface side disposed on the display surface side of the display panel 12 of the loop antenna 15 (the X axis negative direction side), and the upper side of the electrode 16a refers to the surface side disposed opposite to the display surface of the display panel 12 of the electrode 16a (the X axis positive direction side).

In FIG. 5B, the mobile information terminal 10 further includes a switch 21 connected to the first electrode portion 150, an electric field communication unit 22 connected to the switch 21, and a non-contact communication unit 23 connected to the switch 21. The electric field communication unit 22 is also connected to the electrode 16a and the electrode 16b constituting the second electrode portion 160. The non-contact communication unit 23 is also connected to the loop antenna 15. The switch 21 is configured to turn on and off the connection relationship between the first electrode portion 150 and the electric field communication unit 22.

The switch 21 is to be switched to on or off according to whether the mobile information terminal 10 performs electric field communication or non-contact communication. When the mobile information terminal 10 performs electric field communication, the switch 21 connects the first electrode portion 150 and the electric field communication unit 22. Thus, electric field communication can be performed by a condenser with the loop antenna 15 constituting the first electrode portion 150 and the electrode 16a constituting the second electrode portion 160 as an electrode on one side, and the electrode 16b as an electrode on the other side.

When the mobile information terminal 10 performs non-contact communication, the switch 21 separates the first electrode portion 150 from the electric field communication unit 22.

According to the present embodiment, it is possible to reduce the thickness of the mobile information terminal 10 while reducing the electromagnetic influence from the surrounding conductors on the loop antenna 15. That is, it is possible to provide a thin mobile information terminal 10 that can perform non-contact communication operations with stability and high accuracy.

In the above described Embodiments 1 to 4, the first electrode portion 150 has been described as being constituted by one loop antenna 15. However, the present disclosure is not limited to this, and the first electrode portion 150 may be constituted by two or more loop antennas. Further, the second electrode portion 160 has been described as being constituted by one electrode 16 or by two electrodes 16a and 16b. However, the present disclosure is not limited to this, and the second electrode portion 160 may be constituted by one or more electrode. Particularly in Embodiment 2, the second electrode 160 may be constituted by two or more electrodes having a mesh structure, for example. Further, in Embodiment 4, each electrode constituting the second electrode portion 160 may be respectively disposed inside the loop of each loop antenna constituting the first electrode portion 150. That is, as one side of a condenser, there may be two or more electrodes constituted by a loop antenna and an electrode disposed therein, substantially within the same plane.

Hereinafter, electronic devices according to Embodiments 5 to 8 will be described. In the electronic devices according to Embodiments 5 to 8, the loop antenna is used for non-contact charging. Hereinafter, the components similar to those described in the above embodiments will be given the same reference signs and description thereof will be omitted. Note that various variation examples described in the above embodiments are also applied as they are in the following embodiments. Hereinafter, differences from the above embodiments will be mainly described. Non-contact charging refers to charging that transmits electric power without the intervention of metal contacts, connectors or the like. In the following embodiments, an electromagnetic induction method using electromagnetic induction is used as the method by which non-contact charging is performed, however, an electromagnetic field resonance method utilizing the electromagnetic field resonance phenomenon, or an electromagnetic radiation method that converts electric power to electromagnetic radiation and transmit and receive the electromagnetic radiation via an antenna may be used.

Embodiment 5

FIGS. 6A and 6B schematically illustrate an electronic device according to Embodiment 5. FIG. 6A is a front view of the electronic device, and FIG. 6B is a rear view of the electronic device.

Similarly to FIGS. 1A and 1B, the electronic device illustrated in FIGS. 6A and 6B is a mobile information terminal 10, such as a smartphone or the like, and has a display panel 12 with a rectangular shape made of, for example, liquid crystal, provided at the front surface of a housing 11 with a rectangular shape. The mobile information terminal 10 has a sub antenna 13 constituted by a GPS antenna, a wireless LAN antenna or the like, and a main antenna 14 for base station communication. The mobile information terminal 10 further has a loop antenna 17 used for non-contact charging at the rear surface of the housing 11. In the example illustrated in FIG. 6B, the loop antenna 17 is illustrated for the ease of explanation, however, the loop antenna 17 is actually embedded in the housing 11 so as not to be visible to the user.

When the mobile information terminal 10 performs non-contact charging using the loop antenna 17, the user places the mobile information terminal 10 on a fixed charging device installed, for example, at home. At this time, the magnetic field generated from the fixed charging device interlinks with the loop antenna 17, and electromotive force is generated in the loop antenna 17 by electromagnetic induction. In this way, charging is performed in accordance with the principle of electromagnetic induction in non-contact charging. At the same time, the mobile information terminal 10, which is the power receiving side, periodically communicates with the fixed charging device while receiving electric power. The communication contents are mainly the difference from the required amount of electric power, the power transmission stop request, the power being received, and the charging rate of the mobile information terminal 10. At the start of charging, device-specific information, that is, identification information of the mobile information terminal 10 may be transmitted in some cases. Thereby, the fixed charging device, which is the power transmission side, can determine whether the object on the charging surface is a compatible device or an incompatible foreign object.

Figure 7:
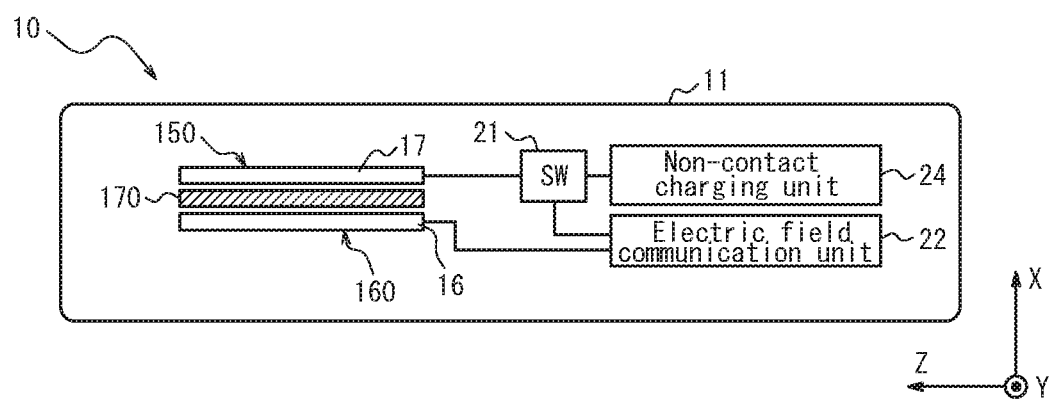
FIG. 7 schematically illustrates a cross section taken from line A-A in FIG. 6B.

FIG. 7 schematically illustrates a cross section taken from line A-A in FIG. 6B. In FIG. 7, the upper part of the housing 11 (namely, the X axis positive direction) is the rear surface of the mobile information terminal 10, and the lower part of the housing 11 (namely, the X axis negative direction) is the front surface of the mobile information terminal 10. The mobile information terminal 10 illustrated in FIG. 7 is such that, the loop antenna 15 and the non-contact communication unit 23 in FIG. 2 are respectively replaced with a loop antenna 17 and a non-contact charging unit (charging unit) 24. The other configurations, operations and functions are the same as those of the mobile information terminal 10 illustrated in FIG. 2. Hereinafter, differences from FIG. 2 will be mainly described.

The mobile information terminal 10 has the loop antenna 17 inside the housing 11. The loop antenna 17 is used for, for example, non-contact charging, however, it is also used for electric field communication as the first electrode portion 150. The first electrode portion 150 and the second electrode portion 160 constitute a condenser used for electric field communication. The condenser is disposed close to the rear surface of the housing 11 so as to be able to capacitively couple with the electric field around an electric field transmission medium such as a human body or the like.

The mobile information terminal 10 further includes a switch 21 connected to the loop antenna 17, an electric field communication unit 22 connected to the switch 21, and a non-contact charging unit 24 connected to the switch 21. The electric field communication unit 22 is also connected to the second electrode portion 160.

The switch 21 is to be switched according to whether the mobile information terminal 10 performs electric field communication or non-contact charging. When the mobile information terminal 10 performs electric field communication, the switch 21 connects the first electrode portion 150 and the electric field communication unit 22. Thus, electric field communication can be performed by the first electrode portion 150, the second electrode portion 160, and the electric field communication unit 22.

When the mobile information terminal 10 performs non-contact charging, the switch 21 connects the loop antenna 17 and the non-contact charging unit 24. Thus, the battery of the mobile information terminal 10 can be non-contactly charged via the loop antenna 17 and the non-contact charging unit 24.

According to the present embodiment, by disposing the first magnetic sheet 170 between the first electrode portion 150 and the second electrode portion 160, similarly to the case of FIG. 2, the following two effects can be obtained.

Firstly, the electromagnetic influence from the conductors constituting the second electrode portion 160 to the loop antenna 17 is reduced by the first magnetic sheet 170. Secondly, by disposing the first magnetic sheet 170 adjacent to the first electrode portion 150, a magnetic field is pulled in and interlinks with the loop antenna 17 more easily. That is, the convergence of magnetic fluxes is enhanced by the first magnetic sheet 170.

Accordingly, by disposing the first magnetic sheet 170 in the above described manner, it is possible to perform non-contact communication operations with greater stability and high accuracy using the loop antenna 17.

Embodiment 6

Figure 8:
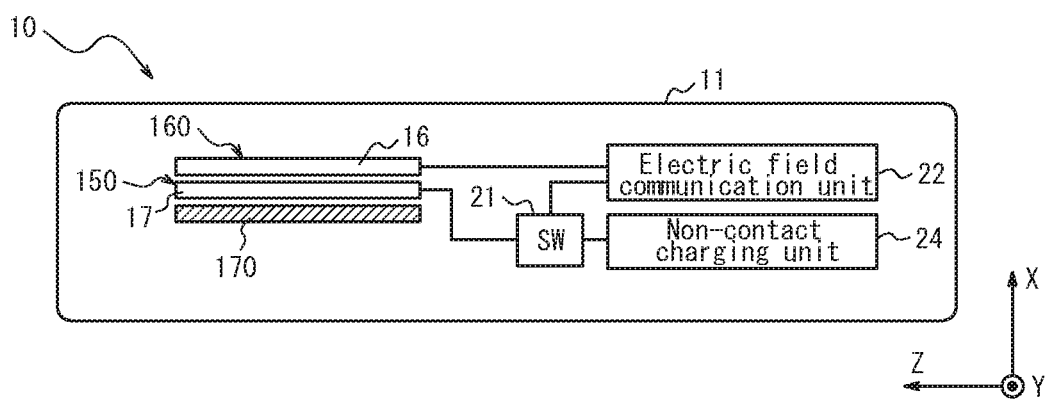
FIG. 8 schematically illustrates a main part of an electronic device according to Embodiment 6.

FIG. 8 schematically illustrates a main part of an electronic device according to Embodiment 6. The electronic device according to the present embodiment is such that, the loop antenna 15 and the non-contact communication unit 23 of the mobile information terminal 10 illustrated in FIG. 3 are respectively replaced with a loop antenna 17 and a non-contact charging unit 24. The other configurations, operations and functions are the same as those of the mobile information terminal 10 illustrated in FIG. 3.

According to this mobile information terminal 10, the convergence effect of magnetic fluxes is enhanced by the first magnetic sheet 170. Additionally, the first magnetic sheet 170 reduces the electromagnetic influence from the conductors constituting a substrate and the like disposed further inside the housing 11 than the first magnetic sheet 170 itself. Accordingly, with the first magnetic sheet 170, it is possible to perform non-contact charging operations with greater stability and high accuracy using the loop antenna 17.

Embodiment 7

Figure 9:
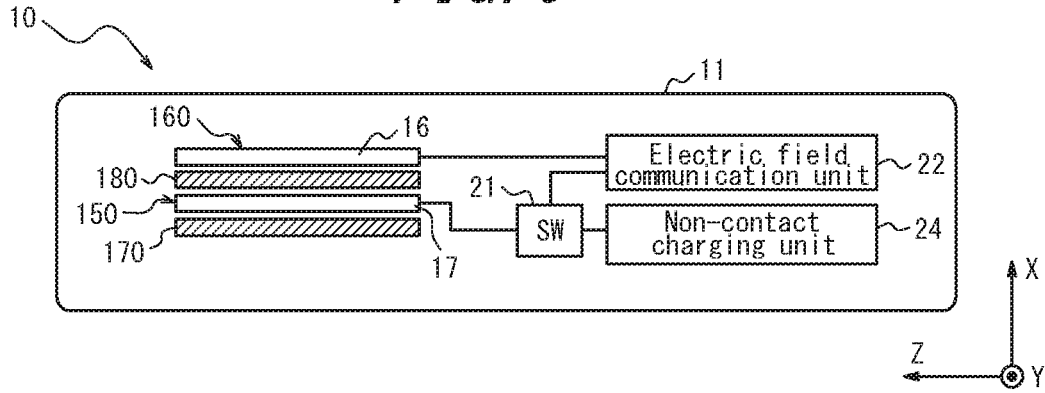
FIG. 9 schematically illustrates a main part of an electronic device according to Embodiment 7.

FIG. 9 schematically illustrates a main part of an electronic device according to Embodiment 7. The electronic device according to the present embodiment is such that, the loop antenna 15 and the non-contact communication unit 23 of the mobile information terminal 10 illustrated in FIG. 4 are respectively replaced with a loop antenna 17 and a non-contact charging unit 24. The other configurations, operations and functions are the same as those of the mobile information terminal 10 illustrated in FIG. 4.

According to this mobile information terminal 10, the following two effects can be obtained.

Firstly, the electromagnetic influence from the surrounding conductors to the loop antenna 17 is reduced. The surrounding conductors refer to the conductors constituting a substrate and the like disposed further inside the housing 11 than the first magnetic sheet 170 and the conductors constituting the second electrode portion 160. The electromagnetic influence from the former is reduced by the first magnetic sheet 170, and the electromagnetic influence from the latter is reduced by the second magnetic sheet 180.

Secondly, the effect of pulling a magnetic field into the loop antenna 17 is further enhanced, and thus a magnetic field having a higher magnetic flux density interlinks with the loop antenna 17. That is, the convergence effect of magnetic fluxes is further enhanced by the first magnetic sheet 170 and the second magnetic sheet 180.

Accordingly, by further adding the second magnetic sheet 180, it is possible to perform non-contact charging operations with greater stability and high accuracy without deteriorating the characteristics of charging operation using the loop antenna 17.

Embodiment 8

Figure 10A:
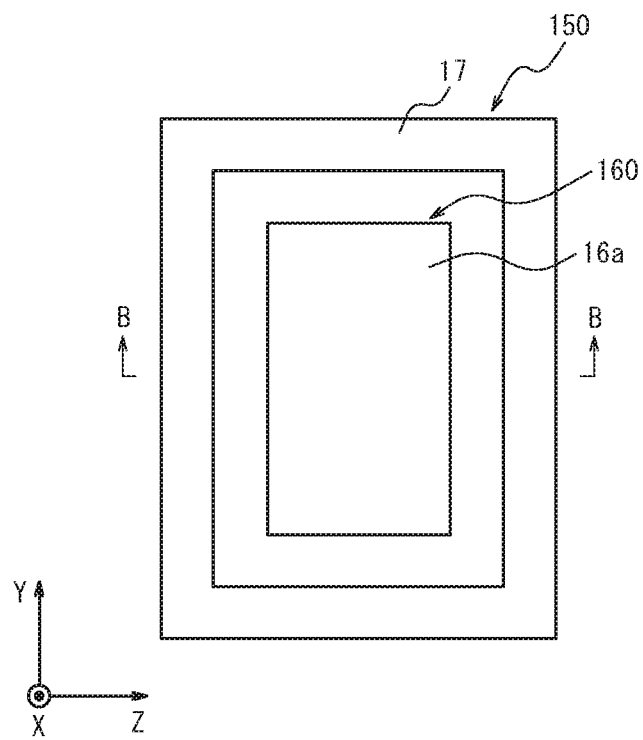
FIGS. 10A and 10B schematically illustrate a main part of an electronic device according to Embodiment 8.
Figure 10B:
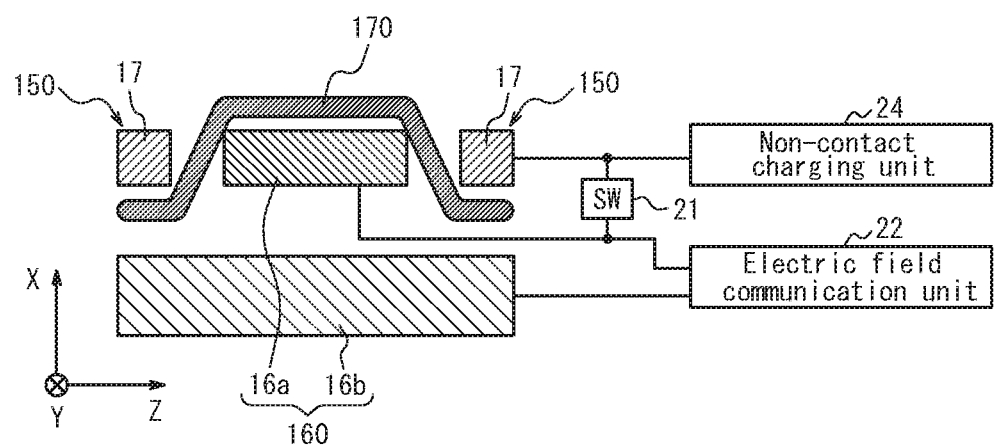

FIGS. 10A and 10B schematically illustrate a main part of an electronic device according to Embodiment 8. FIG. 10A is a rear view of the electronic device, and FIG. 10B is a cross-sectional view taken from line B-B in FIG. 10A. The electronic device according to the present embodiment is such that, the loop antenna 15 and the non-contact communication unit 23 of the mobile information terminal 10 illustrated in FIG. 5 are respectively replaced with a loop antenna 17 and a non-contact charging unit 24. The other configurations, operations and functions are the same as those of the mobile information terminal 10 illustrated in FIG. 5.

According to the present embodiment, it is possible to reduce the thickness of the mobile information terminal 10 while reducing the electromagnetic influence from the surrounding conductors on the loop antenna 17. That is, it is possible to provide a thin mobile information terminal 10 that can perform stable non-contact charging with high accuracy.

Hereinafter, electronic devices according to Embodiments 9 to 12 will be described. The electronic devices according to Embodiments 9 to 12 are obtained by integrating the electronic devices according to Embodiments 1 to 4 and Embodiments 5 to 8. That is, the mobile information terminal 10 has a first loop antenna 15 and a second loop antenna 17 which are respectively used for non-contact communication and non-contact charging. Hereinafter, the components similar to those described in the above embodiments will be given the same reference signs and description thereof will be omitted. Note that various variation examples described in the above embodiments are also applied as they are in the following embodiments. Hereinafter, differences from the above embodiments will be mainly described.

Embodiment 9

FIGS. 11A and 11B schematically illustrate an electronic device according to Embodiment 9. FIG. 11A is a front view of the electronic device, and FIG. 11B is a rear view of the electronic device.

Similarly to FIGS. 1A and 1B, the electronic device illustrated in FIGS. 11A and 11B is a mobile information terminal 10, such as a smartphone or the like, and has a display panel 12 with a rectangular shape made of, for example, liquid crystal, at the front surface of a housing 11 with a rectangular shape. The mobile information terminal 10 has a sub antenna 13 constituted by a GPS antenna, a wireless LAN antenna or the like, and a main antenna 14 for base station communication. The mobile information terminal 10 further has a first loop antenna 15 used for non-contact communication such as Felica® (Felica is a registered trademark in Japan, other countries, or both) or other NFC, and a second loop antenna 17 used for non-contact charging at the rear surface of the housing 11. In FIG. 11B, the first loop antenna 15 is disposed at the rear surface upper part of the housing 11 and the second loop antenna 17 is disposed at the rear surface lower part of the housing 11, however, the present disclosure is not limited to this, and the arrangement may be exchanged. In the example illustrated in FIG. 11B, the loop antennas 15 and 17 are illustrated for the ease of explanation, however, the loop antennas 15 and 17 are actually embedded in the housing 11 so as not to be visible to the user.

Many general mobile information terminals 10 are equipped with the functions of both non-contact communication and non-contact charging. A user may, for example, use the non-contact communication function when performing a settlement at a shop front or the like, and use the non-contact charging function when performing charging at home or the like. As described above, it is common to use each function properly according to the situation.

Figure 12:
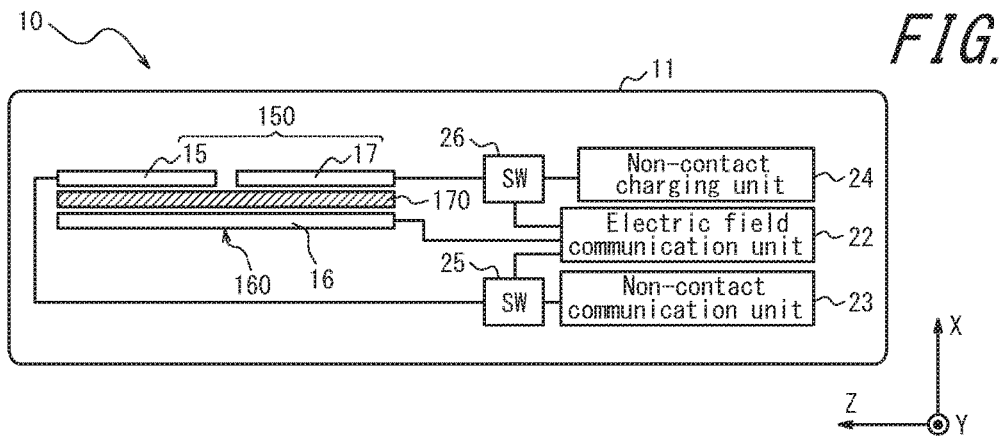
FIG. 12 schematically illustrates a cross section taken from line A-A in FIG. 11B.

FIG. 12 schematically illustrates a cross section taken from line A-A in FIG. 11B. In FIG. 12, the upper part of the housing 11 (namely, the X axis positive direction) is the rear surface of the mobile information terminal 10, and the lower part of the housing 11 (namely, the X axis negative direction) is the front surface of the mobile information terminal 10. In the mobile information terminal 10 illustrated in FIG. 12, the first loop antenna 17 in FIG. 2 and the second loop antenna 17 in FIG. 7 are combined. The other configurations, operations and functions are the same as those of the mobile information terminals 10 illustrated in FIG. 2 and FIG. 7. Hereinafter, differences from FIG. 2 and FIG. 7 will be mainly described.

The mobile information terminal 10 has the first loop antenna 15 and the second loop antenna 17 disposed substantially in the same plane inside the housing 11. The first loop antenna 15 and the second loop antenna 17 are respectively used for non-contact communication and non-contact charging, and are also used for electric field communication by constituting the first electrode portion 150. The first electrode portion 150 and the second electrode portion 160 constitute a condenser used for electric field communication. The condenser is disposed close to the rear surface of the housing 11 so as to be able to capacitively couple with the electric field around an electric field transmission medium such as a human body or the like.

The mobile information terminal 10 has a first switch 25 connected to the first loop antenna 15 and a second switch 26 connected to the second loop antenna 17. The mobile information terminal 10 further has an electric field communication unit 22 connected to the first switch 25 and the second switch 26, a non-contact communication unit 23 connected to the first switch 25, and a non-contact charging unit 24 connected to the second switch 26. The electric field communication 22 is also connected to the second electrode portion 160.

The first switch 25 and the second switch 26 are to be switched according to whether the mobile information terminal 10 performs electric field communication, non-contact communication, or non-contact charging. When the mobile information terminal 10 performs electric field communication, the first switch 25 connects the first electrode portion 150, particularly the first loop antenna 15 and the electric field communication unit 22. The second switch 26 connects the first electrode portion 150, particularly the second loop antenna 17 and the electric field communication unit 22. Thus, electric field communication can be performed by the first electrode portion 150, the second electrode portion 160 and the electric field communication unit 22.

When the mobile information terminal 10 performs non-contact communication, the first switch 25 connects the first loop antenna 15 and the non-contact communication unit 23. Thus, non-contact communication can be performed by the first loop antenna 15 and the non-contact communication unit 23.

On the other hand, when the mobile information terminal 10 performs non-contact charging, the second switch 26 connects the second loop antenna 17 and the non-contact charging unit 24. Thus, the battery of the mobile information terminal 10 can be non-contactly charged via the second loop antenna 17 and the non-contact charging unit 24.

According to the present embodiment, the following two effects can be obtained by disposing the first magnetic sheet 170 between the first electrode portion 150 and the second electrode portion 160.

Firstly, the electromagnetic influence from the conductors constituting the second electrode portion 160 on the first loop antenna 15 and the second loop antenna 17 is reduced by the first magnetic sheet 170. Secondly, by disposing the first magnetic sheet 170 adjacent to the first electrode portion 150, a magnetic field is pulled in and interlinks with the first loop antenna 15 and the second loop antenna 17 more easily. That is, the convergence effect of magnetic fluxes is enhanced by the first magnetic sheet 170.

Accordingly, by disposing the first magnetic sheet 170 in the above described manner, it is possible to perform non-contact communication operations with greater stability and high accuracy using the first loop antenna 15 and non-contact charging operations with greater stability and high accuracy using the second loop antenna 17.

According to the present embodiment, since the two loop antennas respectively used for non-contact communication and non-contact charging are also used for electric field communication as the first electrode portion 150, the capacity of the condenser consisting of the first electrode portion 150 and the second electrode portion 160 is increased. As a result, compared to the mobile information terminals 10 according to the previous embodiments, the electric field communication sensitivity is further improved, and thus electric field communications with greater stability and high accuracy is possible. When the user grips the rear surface of the mobile information terminal 10, it is possible to perform electric field communication even if the surface of the hand is close to only one of the first loop antenna 15 and the second loop antenna 17. In other words, the mobile information terminal 10 is able to perform stable electric field communication without depending on how it is held by the user.

Embodiment 10

Figure 13:
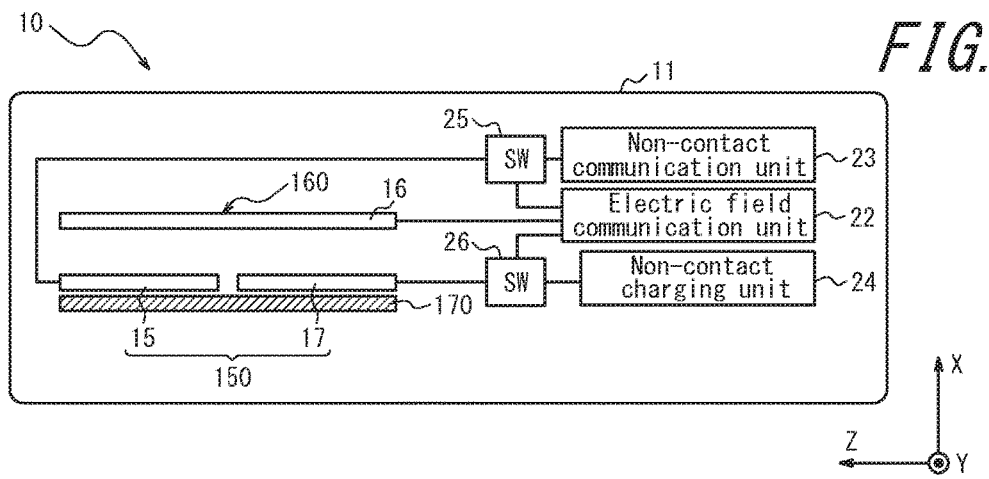
FIG. 13 schematically illustrates a main part of an electronic device according to Embodiment 10.

FIG. 13 schematically illustrates a main part of an electronic device according to Embodiment 10. In the mobile information terminal 10 illustrated in FIG. 13, the first loop antenna 15 illustrated in FIG. 3 and the second loop antenna 17 illustrated in FIG. 8 are combined. That is, the first electrode portion 150 is constituted by the first loop antenna 15 and the second loop antenna 17 disposed substantially in the same plane. The other configurations, operations and functions are the same as those of the mobile information terminals 10 illustrated in FIG. 3 and FIG. 8.

According to the present embodiment, the convergence effect of magnetic fluxes is enhanced by the first magnetic sheet 170. Additionally, the first magnetic sheet 170 reduces the electromagnetic influence from the conductors constituting a substrate and the like disposed further inside the housing 11 than the first magnetic sheet 170 itself. Accordingly, with the first magnetic sheet 170, it is possible to perform non-contact communication operations with greater stability and high accuracy using the first loop antenna 15 and non-contact charging operations with greater stability and high accuracy using the second loop antenna 17.

Since the two loop antennas respectively used for non-contact communication and non-contact charging are also used for electric field communication as the first electrode portion 150, the capacity of the condenser consisting of the first electrode portion 150 and the second electrode portion 160 is increased. As a result, the electric field communication sensitivity is further improved, and thus electric field communications with greater stability and high accuracy is possible. When the user grips the rear surface of the mobile information terminal 10, it is possible to perform electric field communication even if the surface of the hand is close to only one of the first loop antenna 15 and the second loop antenna 17. In other words, the mobile information terminal 10 is able to perform stable electric field communication without depending on how it is held by the user.

Embodiment 11

Figure 14:
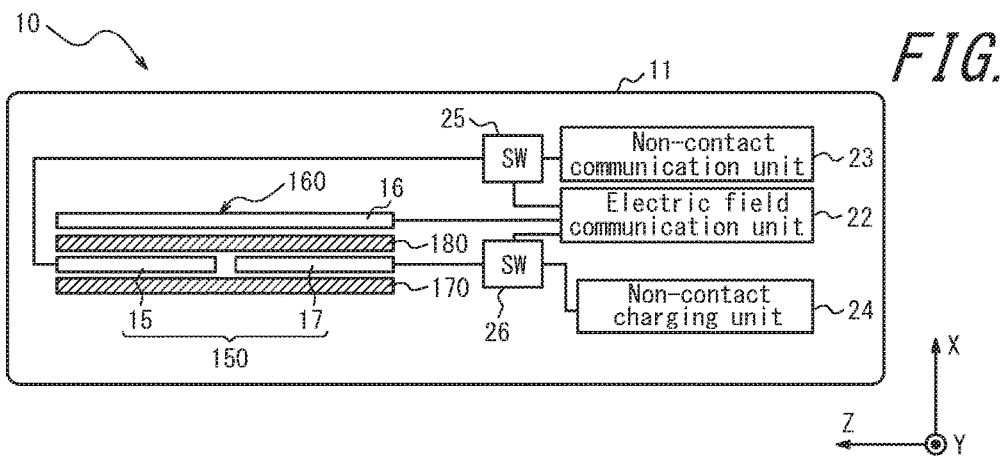
FIG. 14 schematically illustrates a main part of an electronic device according to Embodiment 11.

FIG. 14 schematically illustrates a main part of an electronic device according to Embodiment 11. In the mobile information terminal 10 illustrated in FIG. 14, the first loop antenna 15 in FIG. 4 and the second loop antenna 17 in FIG. 9 are combined. That is, the first electrode portion 150 is constituted by the first loop antenna 15 and the second loop antenna 17 disposed substantially in the same plane. The other configurations, operations and functions are the same as those of the mobile information terminals 10 illustrated in FIG. 4 and FIG. 9.

According to the present embodiment, the following two effects can be obtained.

Firstly, the electromagnetic influence from the surrounding conductors on the first loop antenna 15 and the second loop antenna 17 is reduced. The surrounding conductors refer to the conductors constituting a substrate and the like disposed further inside the housing 11 than the first magnetic sheet 170 and the conductors constituting the second electrode portion 160. The electromagnetic influence from the former is reduced by the first magnetic sheet 170, and the electromagnetic influence from the latter is reduced by the second magnetic sheet 180.

Secondly, the effect of pulling a magnetic field into the first loop antenna 15 and the second loop antenna 17 is further enhanced, and thus a magnetic field with a higher magnetic flux density interlinks with the first loop antenna 15 and the second loop antenna 17. That is, the convergence effect of magnetic fluxes is further enhanced by the first magnetic sheet 170 and the second magnetic sheet 180.

Accordingly, by further adding the second magnetic sheet 180, it is possible to perform non-contact communication operations with greater stability and high accuracy using the first loop antenna 15 and non-contact charging operations with greater stability and high accuracy using the second loop antenna 17.

According to the present embodiment, since the two loop antennas respectively used for non-contact communication and non-contact charging are also used for electric field communication as the first electrode portion 150, the capacity of the condenser consisting of the first electrode portion 150 and the second electrode portion 160 is increased. As a result, the electric field communication sensitivity is further improved, and thus electric field communication with greater stability and high accuracy is possible. When the user grips the rear surface of the mobile information terminal 10, it is possible to perform electric field communication even if the surface of the hand is close to only one of the first loop antenna 15 and the second loop antenna 17. In other words, the mobile information terminal 10 is able to perform stable electric field communication without depending on how it is held by the user.

Embodiment 12

Figure 15A:
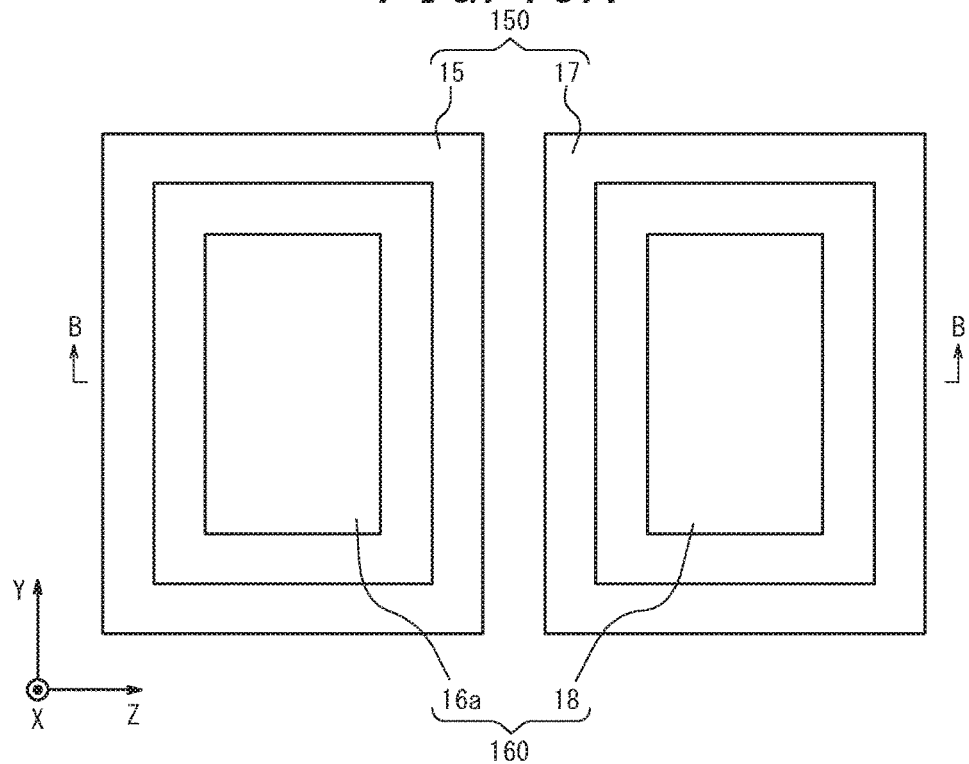
FIGS. 15A and 15B schematically illustrate a main part of an electronic device according to Embodiment 12.
Figure 15B:
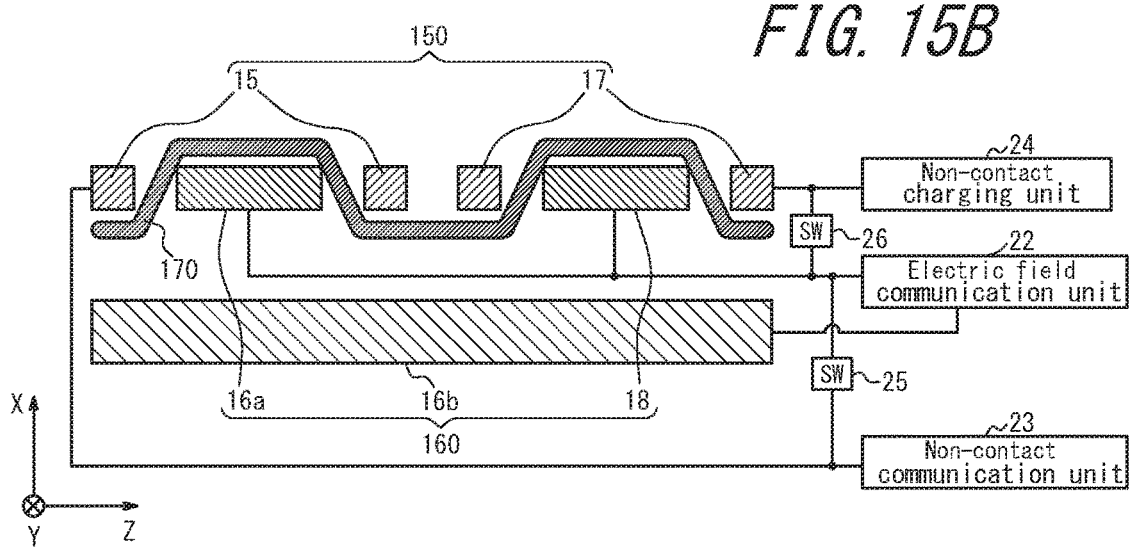

FIGS. 15A and 15B schematically illustrate a main part of an electronic device according to Embodiment 12. FIG. 15A is a rear view of the electronic device, and FIG. 15B is a cross-sectional view taken from line B-B in FIG. 15A. The electronic device according to the present embodiment is obtained by integrating the electronic devices according to Embodiment 4 and Embodiment 8. The mobile information terminal 10 has a first loop antenna 15 and a second loop antenna 17.

In the present embodiment, the first electrode portion 150 is constituted by the first loop antenna 15 and the second loop antenna 17 disposed substantially in the same plane. The second electrode portion 160 is constituted by three electrodes 16a, 16b and 18. As illustrated in FIG. 15B, the electrodes constituting the second electrode portion 160 are disposed substantially in the same plane with the loop antennas constituting the first electrode portion 150, and each electrode is respectively disposed inside the loop of each loop antenna. More particularly, the electrode 16a is disposed inside the loop of the first loop antenna 15, the electrode 16b is disposed further inside the housing than the electrode 16a and the electrode 18, and the electrode 18 is disposed inside the loop of the second loop antenna 17.

In FIG. 15A, the first magnetic sheet 170 is not illustrated, however, as illustrated in FIG. 15B, the first magnetic sheet 170 is disposed adjacent to the first electrode portion 150 to fill the spaces between the loop antennas and the electrodes. More particularly, the first magnetic sheet 170 is disposed at the lower side of the first loop antenna 15, and by passing through a gap between the first loop antenna 15 and the electrode 16a is disposed at the upper side of the electrode 16a. Then, the first magnetic sheet 170 passes through another gap between the loop antenna 15 and the electrode 16a and is again disposed at the lower side of the loop antenna 15. Further, the first magnetic sheet 170 is disposed at the lower side of the second loop antenna 17, and by passing through a gap between the second loop antenna 17 and the electrode 18 is disposed at the upper side of the electrode 18. Then, the first magnetic sheet 170 passes through another gap between the second loop antenna 17 and the electrode 18 and is again disposed at the lower side of the second loop antenna 17. The lower side of each loop antenna refers to the surface side disposed on the display surface side of the display panel 12 of each loop antenna (the X axis negative direction side), and the upper side of each electrode refers to the surface side disposed opposite to the display surface of the display panel 12 of each electrode (the X axis positive direction).

The mobile information terminal 10 has a first switch 25 connected to the first loop antenna 15 and a second switch 26 connected to the second loop antenna 17. The mobile information terminal 10 further has an electric field communication unit 22 connected to the first switch 25 and the second switch 26, a non-contact communication unit 23 connected to the first switch 25, and a non-contact charging unit 24 connected to the second switch 26. The electric field communication unit 22 is also connected to the electrode 16a, the electrode 16b and the electrode 18 constituting the second electrode portion 160.

The first switch 25 is configured to turn on and off the connection relationship between the first loop antenna 15 and the electric field communication unit 22. The second switch 26 is configured to turn on and off the connection relationship between the second loop antenna 17 and the electric field communication unit 22.

The first switch 25 and the second switch 26 are to be switched to on or off according to whether the mobile information terminal 10 performs electric field communication, non-contact communication, or non-contact charging. When the mobile information terminal 10 performs electric field communication, the first switch 25 connects the first loop antenna 15 and the electric field communication unit 22, and the second switch 26 connects the second loop antenna 17 and the electric field communication unit 22. As a result, a condenser is configured with the first loop antenna 15 constituting the first electrode portion 150, the electrode 16*a* constituting the second electrode portion 160, the second loop antenna 17 constituting the first electrode portion 150, and the electrode 18 constituting the second electrode portion 160 as an electrode on one side, and the electrode 16*b* as an electrode on the other side. With this condenser, electric field communication can be performed.

When the mobile information terminal 10 performs non-contact communication, the first switch 25 separates the first loop antenna 15 from the electric field communication unit 22. Further, when the mobile information terminal 10 performs non-contact charging, the second switch 26 separates the second loop antenna 17 from the electric field communication unit 22.

According to the present embodiment, it is possible to reduce the thickness of the mobile information terminal 10 while reducing the electromagnetic influence from the surrounding conductors on the first loop antenna 15 and the second loop antenna 17. In other words, it is possible to provide a thin mobile information terminal 10 that can perform non-contact communication operations with stability and high accuracy.

According to the present embodiment, since the two loop antennas respectively used for non-contact communication and non-contact charging are also used for electric field communication as the first electrode portion 150, the capacity of the condenser consisting of the first electrode portion 150 and the second electrode portion 160 is increased. As a result, the electric field communication sensitivity is further improved, and thus electric field communication with greater stability and high accuracy is possible. When the user grips the rear surface of the mobile information terminal 10, it is possible to perform electric field communication even if the surface of the hand is close to only one of the first loop antenna 15 and the second loop antenna 17. In other words, the mobile information terminal 10 is able to perform stable electric field communication without depending on how it is held by the user.

In Embodiments 9 to 12, the first electrode portion 150 is constituted by the first loop antenna 15 and the second loop antenna 17. However, the present disclosure is not limited to this, and only one of the first loop antenna 15 and the second loop antenna 17 may be used as the first electrode portion 150 to perform electric field communication. For example, when the first electrode portion 150 is constituted by the first loop antenna 15 only, the mobile information terminal 10 is substantially the same as those described in Embodiments 1 to 4. When the first electrode portion 150 is constituted by the second loop antenna 17 only, the mobile information terminal 10 is substantially the same as those described in Embodiments 5 to 8.

It would be apparent to those skilled in the art that the present disclosure can be realized in other predetermined forms other than the above described embodiments without departing from the spirit or essential features thereof. Therefore, the above description only includes some of the examples, and embodiments of the present disclosure shall not be limited thereto. The scope of the disclosure is defined by the appended claims rather than by the above description. Among any changes, several changes within the equivalent scope shall be included therein.

In the above described embodiments, the first electrode portion 150 and the second electrode portion 160 are described as for electric field communication, however, the present disclosure is not limited thereto, and each electrode portion may be used to perform myoelectric potential measurement, electrocardiogram measurement, electroencephalogram measurement or the like. When measuring myoelectric potential or electrocardiogram, the user shall previously bring the mobile information terminal 10 into contact with the optimal position of the human body. When measuring electroencephalogram, the mobile information terminal 10 shall be, for example, a glasses type wearable device or a head mounted display (HMD). Each electrode may be disposed at the frame portion of the glasses or the head portion of the HMD. In this way, the mobile information terminal 10 can be applied as a sensor as well as for electric field communication. In the above described embodiments, the first electrode portion 150 and the second electrode portion 160 are assumed to be disposed inside the housing 11, however, a part or the whole of the first electrode portion 150 and the second electrode portion 160 may be disposed outside the housing 11.

REFERENCE SIGNS LIST

10 Mobile information terminal (electronic device)
11 Housing
15 (First) loop antenna
16, 16*a*, 16*b*, 18 Electrode
17 (Second) loop antenna
21, 25, 26 Switch
22 Electric field communication unit
23 Non-contact communication unit (communication unit)
24 Non-contact charging unit (charging unit)
150 First electrode portion
160 Second electrode portion
170 First magnetic sheet
180 Second magnetic sheet

The invention claimed is:

1. An electronic device that performs electric field communication via an electric field transmission medium, comprising:
   a first electrode portion and a second electrode portion for performing electric field communication;
   a first magnetic sheet;
   a switch connected to a first loop antenna;
   an electric field communication unit connected to the switch; and
   a communication unit connected to the switch, wherein
   the first electrode portion has at least the first loop antenna,
   the first magnetic sheet is disposed adjacent to the first electrode portion,
   only one of the electric field communication unit and the communication unit is selectively connected to the first loop antenna via the switch,
   when the electric field communication unit is connected to the first loop antenna via the switch, both of the first electrode portion and the second electrode portion constitute a condenser configured to be capacitively coupled with an electric field around a human body, and when the communication unit is connected to the first loop antenna via the switch, only the second electrode portion constitutes the condenser configured to be capacitively coupled with the electric field around the human body.

2. The electronic device according to claim 1, wherein the first loop antenna is used for non-contact communication.

3. The electronic device according to claim 1, wherein the first electrode portion further has a second loop antenna.

4. The electronic device according to claim 3, wherein
the first loop antenna is used for non-contact communication; and
the second loop antenna is used for non-contact charging.

5. The electronic device according to claim 3, wherein
one of two electrodes included in the second electrode portion is disposed inside a loop of the first loop antenna; and
the other one of the two electrodes is disposed inside a loop of the second loop antenna.

6. The electronic device according to claim 1, further comprising a housing; wherein
the first electrode portion, the second electrode portion, and the first magnetic sheet are disposed in an order of the first electrode portion, the first magnetic sheet, and the second electrode portion in a direction from an outer surface of the housing towards the inside of the housing.

7. The electronic device according to claim 1, further comprising a housing; wherein
the first electrode portion, the second electrode portion, and the first magnetic sheet are disposed in an order of the second electrode portion, the first electrode portion, and the first magnetic sheet in a direction from an outer surface of the housing towards the inside of the housing; and
the second electrode portion has an electrode with a mesh structure.

8. The electronic device according to claim 7, further comprising a second magnetic sheet; wherein
the second magnetic sheet is disposed between the second electrode portion and the first electrode portion.

9. The electronic device according to claim 1, wherein one electrode included in the second electrode portion is disposed inside a loop of the first loop antenna.

10. An electronic device that performs electric field communication via an electric field transmission medium, comprising:
a first electrode portion and a second electrode portion for performing electric field communication;
a first magnetic sheet;
a switch connected to a first loop antenna;
an electric field communication unit connected to the switch; and
a charging unit connected to the switch, wherein
the first electrode portion has at least the first loop antenna,
the first magnetic sheet is disposed adjacent to the first electrode portion,
only one of the electric field communication unit and the charging unit is selectively connected to the first loop antenna via the switch,
when the electric field communication unit is connected to the first loop antenna via the switch, both of the first electrode portion and the second electrode portion constitute a condenser configured to be capacitively coupled with an electric field around a human body, and
when the charging unit is connected to the first loop antenna via the switch, only the second electrode portion constitutes the condenser configured to be capacitively coupled with the electric field around the human body.

11. The electronic device according to claim 10, wherein the first loop antenna is used for non-contact charging.

12. An electronic device that performs electric field communication via an electric field transmission medium, comprising:
a first electrode portion and a second electrode portion for performing electric field communication;
a first magnetic sheet;
a first switch connected to a first loop antenna;
a second switch connected to a second loop antenna;
an electric field communication unit connected to the first switch and the second switch;
a communication unit connected to the first switch; and
a charging unit connected to the second switch, wherein
the first electrode portion has the first loop antenna and the second loop antenna,
the first magnetic sheet is disposed adjacent to the first electrode portion,
only one of the electric field communication unit and the communication unit is selectively connected to the first loop antenna via the first switch,
when the electric field communication unit is connected to the first loop antenna via the first switch, both of the first electrode portion and the second electrode portion constitute a condenser configured to be capacitively coupled with an electric field around a human body,
when the communication unit is connected to the first loop antenna via the first switch, only the second electrode portion constitutes the condenser configured to be capacitively coupled with the electric field around the human body,
only one of the electric field communication unit and the charging unit is selectively connected to the second loop antenna via the second switch,
when the electric field communication unit is connected to the second loop antenna via the second switch, both of the first electrode portion and the second electrode portion constitute a condenser configured to be capacitively coupled with an electric field around a human body, and
when the charging unit is connected to the second loop antenna via the second switch, only the second electrode portion constitutes the condenser configured to be capacitively coupled with the electric field around the human body.

* * * * *